J. L. LOWRY.

Fire-Plug.

No. 5,017.

Reissued July 30, 1872

Witnesses:
T. C. Brecht.
H. M. Phillips.

Joseph L. Lowry, Inventor
By Edwin L. Stanton
Johnson, Klaucke & Co
his attorneys.

Scale.

Original Scale 1/4 to the inch

4 Sheets

4 Sheets--Sheet 2.

J. L. LOWRY.

Fire-Plug.

No. 5,017.

Reissued July 30, 1872.

Witnesses:
T. C. Brecht.
H. M. Phillips.

Joseph L. Lowry, Inventor.
by Edwin L. Klaucke
Johnson, Klaucke & Co
his attorneys 4 Sheets 4 Sheets--Sheet 3.

J. L. LOWRY.

Fire-Plug.

No. 5,017

Reissued July 30, 1872.

Witnesses:
T. C. Brecht
H. M. Phillips.

Joseph L. Lowry, Inventor.
by Edwin L. Stanton
Johnson, Klaucke & Co
his attorneys.

4 Sheets.

4 Sheets--Sheet 4.

J. L. LOWRY.

Fire-Plug.

No. 5,017.

Reissued July 30, 1872.

Witnesses:

T. C. Brecht.

L. M. Phillips.

Joseph L. Lowry, Inventor.

by Edwin L. Clarke

Johnson, Klaucke & Co his attorneys

UNITED STATES PATENT OFFICE.

JOSEPH L. LOWRY, OF PITTSBURG, PENNSYLVANIA.

IMPROVEMENT IN FIRE-PLUGS.

Specification forming part of Letters Patent No. 23,034, dated February 22, 1859; reissue No. 1,026, dated August 14, 1860; reissue No. 5,017, dated July 30, 1872.

*To all whom it may concern:*

Be it known that I, JOSEPH L. LOWRY, of Pittsburg, in the county of Allegheny and State of Pennsylvania, have invented a new and useful Improvement in Stop-Cock and Fire-Plug—the stop-cock to shut off the water in the streets while repairing or otherwise, and the fire-plug to supply water in time of fire; and I do hereby declare that the following is a full and exact description thereof, reference being had to the accompanying drawing and to the letters of reference marked thereon.

Figure 1:
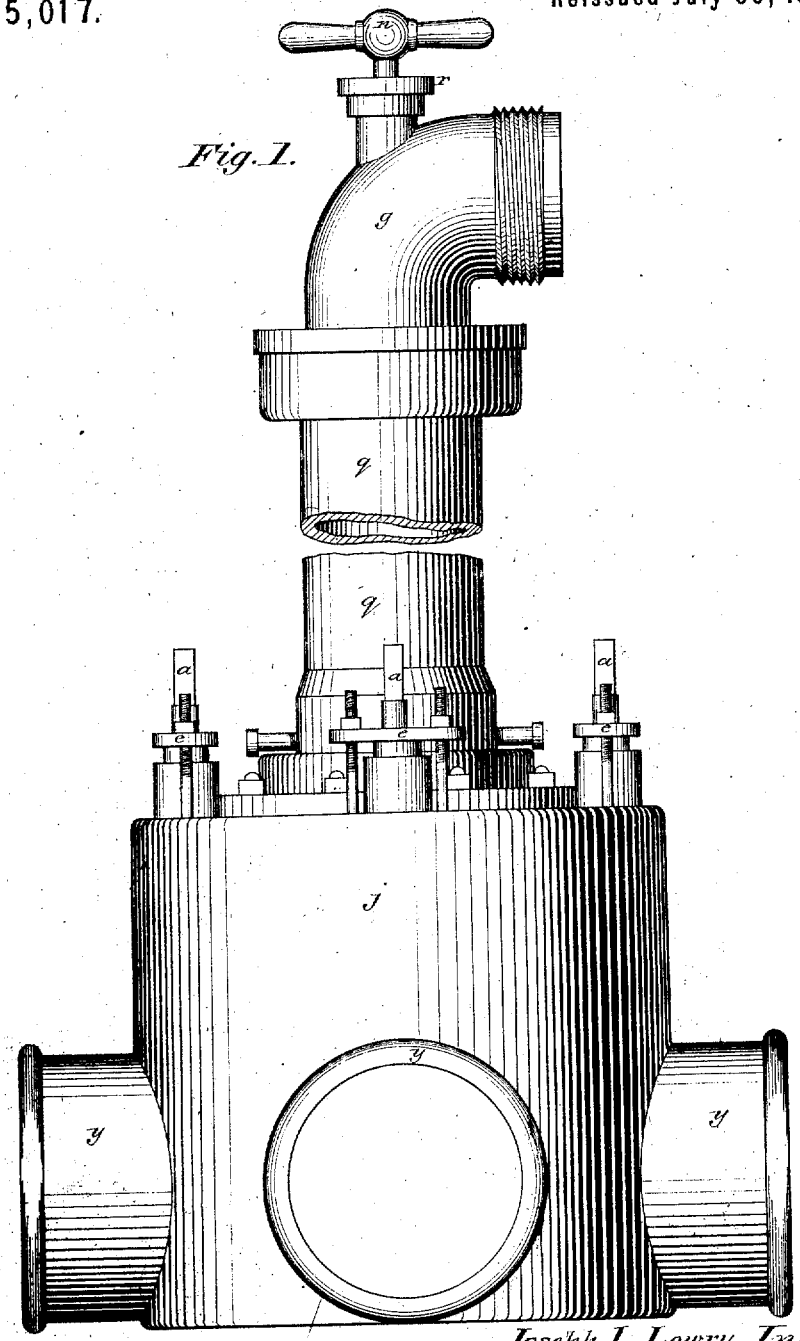
Figure 2:
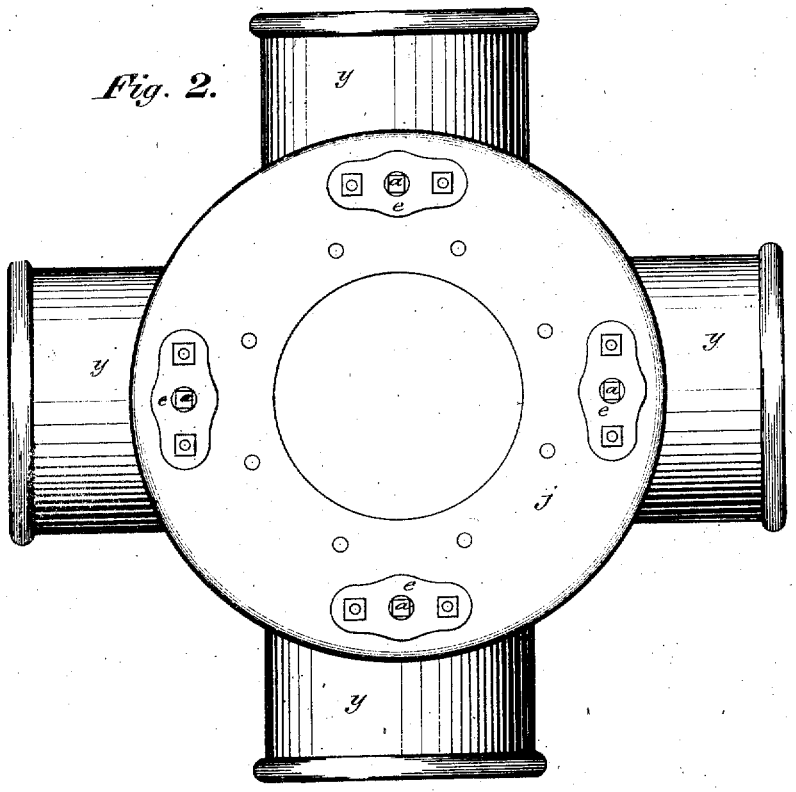
Figure 6:
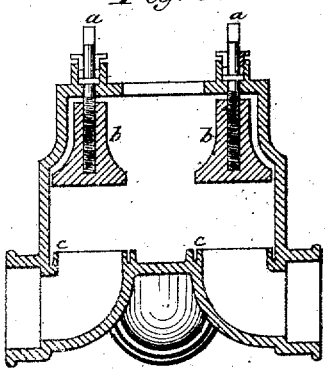
Figure 7:
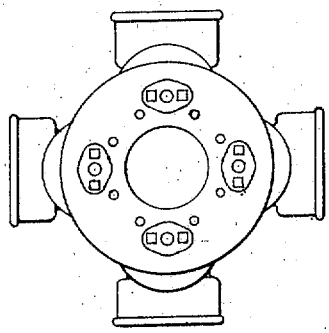
Figure 3:
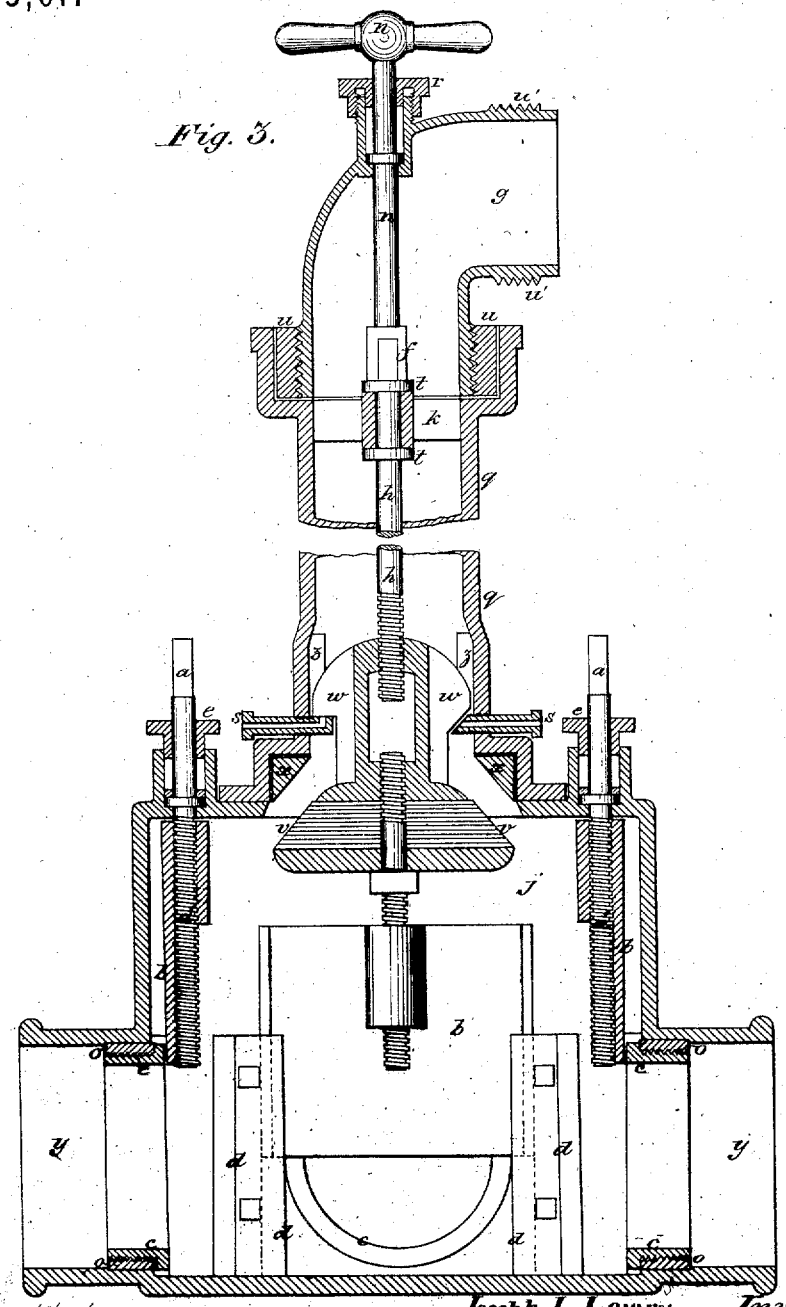
Figure 8:
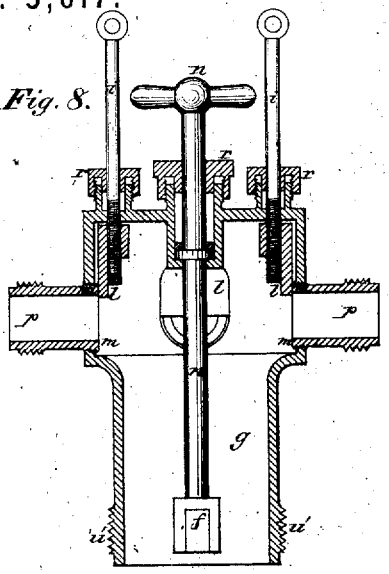
Figure 9:
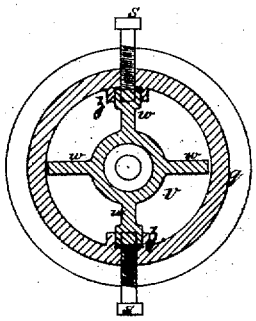
Figure 4:
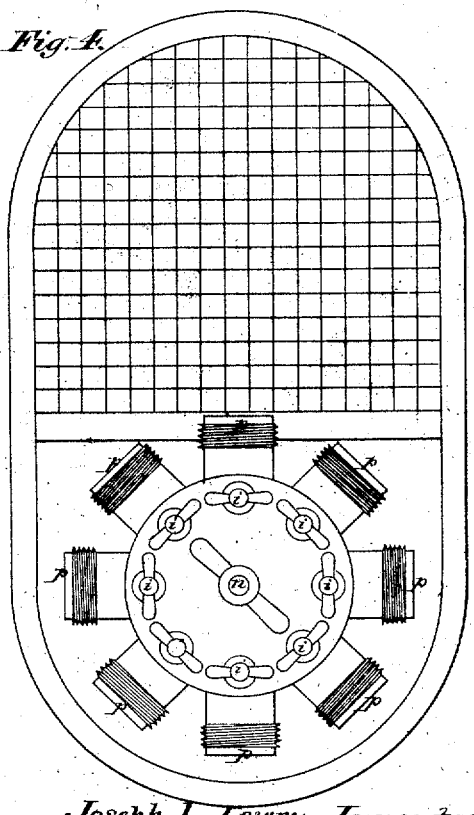
Figure 5:
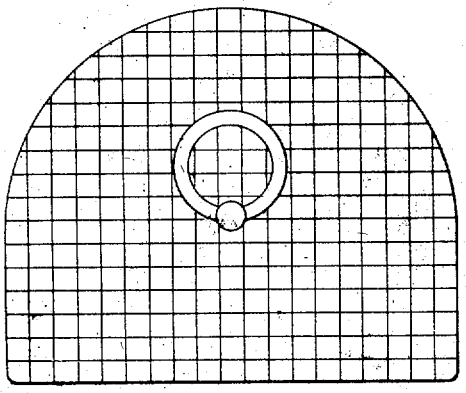

In the drawing, Figure 1 represents an exterior view of the stop-cock, fire-plug, and the removable elbow for the steam-fire-engine hose, put together in the way they are to be used. Fig. 2 represents a top view of the stop-cock, the plug or cap being removed therefrom. Fig. 3 represents a vertical section of the parts shown in Fig. 1. Fig. 4 represents the frame or caps that cover the stop-cock and fire-plug, one of the caps being removed to show the many-hose branch screwed onto the plug. Fig. 5 represents the cap removed when the plug is in service. Fig. 6 represents a vertical section of a stop-cock with puppet-valves. Fig. 7 represents a top view of the stop-cock shown in Fig. 6. Fig. 8 represents a vertical section of the many-branch or head for the hose, shown in plan in Fig. 4; and Fig. 9 represents a horizontal section of the plug, showing the valve and its wings.

Referring to the stop-cock, *a a* are the stems of screws *a'*, by which the valves are opened and shut. *e e* are the stuffing-boxes. *y y* are branches or bowls. *c c* are the valve-seats. *o o* are rings fitted into the branches or bowls *y* for the valve-seats. *b b* are the valves or gates. *d d* are the back bearings or guides for the valves.

Referring to the fire-plug, *v* is the valve. *x x* is the valve-seat. *w w* are the wings of the valve. *s s* are the hollow waste screw-stems. *h h* is the valve-rod. *t t* are the valve-rod collars. *u u* is the female screw for the attachment of the hose-branch to the plug.

Referring to the elbow or branch for the fire-engine, *g g* is the elbow or hose-branch. *r* is the stuffing-boxes or glands. *n n* is the valve-wrench or key.

Referring to the hose-branch for the engine, Fig. 8, *i i* are the valve screw-rods. *l l* are the valves. *r r* are the stuffing-boxes or glands; *n n*, the wrench or key for the valve-rod. *m m* are the valve-seats. *p p* are the screw-nozzles for the hose. *f* is the socket to catch the valve-rod *h* of the plug, to open and close the valve *v*, Fig. 3.

To enable others skilled in the art to make and use my invention, I will proceed to describe its construction and operation.

I construct the chamber *j* for the stop-cock, Figs. 1, 2, and 3, so that four valves or gates, *b b*, if necessary, of the size desired, have sufficient room to operate in one chamber *j*, which chamber may be cast cylindrical or otherwise. Cast on the chamber *j* are four branches or bowls, *y y*, to connect with the pipes in the streets, corresponding to those of a cross-pipe, such as are now in common use. These branches *y y* may be cast on said chamber *j* close to the bottom, as shown in Figs 1 and 3, in which case the valve *b* will have to shut down in order to close it or stop the flow of water; or said branches *y y* may be cast on said chamber *j* close to the top, in which case the valve *b* will have to be raised up to close it or stop the flow of water in the pipe. The valve-seat *c c* may be either leaded or fitted the ordinary way, if desired; but as they are liable to get out of order, and attended with a great deal of expense and labor, the stop-cocks now in general use having to be lifted out, and requiring the street to be dug open and the pipes cut, to avoid this trouble and expense, instead of leading or pinning in the valve-seat *c* permanently, I fit into the mouth of each branch *y y* in the chamber *j* a permanent brass ring, *o o*, Fig. 3, being more easily done than boring out the mouth of the said branch *y*. Inside of this brass ring *o* I cut a thread, which corresponds with a thread cut on the outside of the valve-seat *c*. The valve-seat *c* can then be secured into the ring *o* similar to the manner in which hose attachments are made; or, secondly, instead of cutting a thread on the valve-seat *c* or ring *o*, the valve-seat *c* and ring *o* can be turned with a slight taper, the larger end of the opening in the ring *o* being in the interior of the chamber *j*, so that said valve-seat *c* can be tightly set into said ring *o* from the interior of said chamber *j*; or, thirdly, if desired to make greater security, the valve-seat *c* can have a number of screws inserted through the collar or rim of the valve-seat *c* into the brass ring *o* or chamber *j*, the heads of said screws being sunk so as to cause no obstruction to the working of the valves *b*, (lead or other matter might be used instead of brass, but I do not consider it so secure or permanent;) or, fourthly, the brass ring can be dispensed with by boring the branch *y*, so as to form an even face for the valve-seat *c*. The mouth of said branch can be bored or cut with a screw so as to answer the purpose for which the ring *o* is applied. By this arrangement, the chamber *j* and fire-plug *q* being surrounded by a box such as is now in common use, the fire-plug pipe and its valve *q* (answering the purpose of a cap to the chamber) can be unscrewed and detached from the chamber or stop-cock *j*, having an opening sufficiently large to take out the valve *b* or the valve-seat *c*, or replace the same, or insert new ones, without disturbing the pipes.

*Fire-Plug.*

I construct my fire-plug, Figs. 1, 3, and 8, *g q*, so as either to sit directly on the main or cross pipes, as now used, or on my stop-cock *j*, which answers the purpose of a cross-pipe. The valve *v*, Fig. 3, and valve-seat *x*, are constructed similar to that in use, being a conical-shaped leather valve, with this difference: On the upper washer, that holds together the leather valve, I cast four wings, *w w*, of sufficient diameter or width to keep the valve in the center of the fire-plug pipe *q q*. A short distance from the upper end two of the wings *w w* are contracted in width or diameter so as to form a T or wedge shaped head or shoulder, as shown in the drawing. In the inside of the plug-pipe *q q*, close above the valve-seat *x*, are cast, opposite each other, two guides or slides, Z. Between these slides the wings *w w* move up and down, the guard Z preventing the valve *v* from turning round by motion of the valve-rod *h*. Between the slides Z, at the lower end, are two set-screws, *s s*. Through the center lengthwise in one or both there is a small hole drilled, which acts as a waste-cock. When the plug-pipe *q q* is shut, the wings *w w* are raised off the set-screws *s s*, giving room for the waste water to pass out. When the plug is opened, the valve-rod *h* being turned round, the collars *t t* act against the bar *k*, which is cast in the upper end of the plug-pipe *q q*, preventing the rod *h* from rising or falling. The screw on the lower end of the rod, acting in a nut either in the valve *v* or in a nut cut in the rod *h* above the valve *v*, forces the valve *v* down till the wings *w w* rest on the set-screws *s s*, closing the waste-cock or holes *s s*, and opening the plug-pipe *q*. The upper end of the plug-pipe *q* is cast with a bowl, into which there is fitted a brass screw, *u u*, corresponding with a screw on the hose-branch, Figs. 3, 4, and 8, and elbow *g*. When the plug is used the hose branch or elbow is screwed into the plug-pipe *q*, the wrench or key *n* having a square socket, *f*, which, when pressed down, catches on the head of the valve-rod *h h*. By turning the key or wrench *n n* the valve *v* is raised or depressed at pleasure. The elbow *g* is a single bent tube or pipe with a screw on each end, the one to screw into the plug-pipe *q*, and the other screw to attach the hose or suction pipe.

The hose-branch, Figs. 4 and 8, is intended for the use of hose companies and engines, and may be cast in one piece, boring out the chamber and using circular valves; or the chamber and its branches may be made separate. Screws are cut in each end of the branches *p p* when made separate, as shown in Fig. 8, the one to attach the hose and the other to screw the branch fast to the chamber. The end that is screwed into the chamber is placed so as to answer for valve-seats *m m* to the valves *l*, and in this way the valve-seats are not only easily made, but rendered adjustable. The pressure of the water being from the inside, guards are not needed to keep the valves *l l* to their seats.

The difficulty in making attachments in time of fire in entering the male screw *p* into the female screw, owing to their having the threads continued to the end or point, causing delay and trouble, I remedy by carrying the thread of the male screws *p* and female screws *u* to within one-fourth to one-half inch of the end of either or both of them, so that the male screw *p* enters sufficiently far as to keep the screw from slipping and in line with each other. The hose-branch shown in Figs. 4 and 8 has a vertical stem of about eighteen inches in length below the hose-pipes *p*, and when connected with the plug-pipe will bring the nozzles above the surface of the ground about a foot, thus making it very convenient in attaching the hose.

The difference between my chamber *j* and the chamber of the stop-cock now in use is, mine is constructed so as to answer the double purpose of the cross-pipe, and either one, two, three, or more of the chambers of the stop-cocks now in use, being easier to fit up, and not more than half the weight of iron, requiring but one box and cap to cover the whole—viz., fire-plug and stop-cock. Those now in use, being single, require the cross-pipe to connect them, and also a separate box and cap to cover each one of them. They, having their valve-seats permanently fitted in the chamber, cannot be repaired without first digging open the streets and lifting out the stop-cock. Mine, on the contrary, is so arranged that the valve and its seat can be taken out of the chamber without disturbing the pipes or stop-cocks.

The difference between my fire-plug and those now in use is, the latter has no many-way valved head or nozzles, which may be used all together or separately, without interfering with the other valved hose-branches; and, moreover, being set on the pavement and the water-pipes being laid in the middle of the street, it requires a pipe extending from said main pipe in the street to the plug on the pavement to form a connection. When the plug is shut the water in this connecting-pipe has no circulation, flow, or motion, and freezes in severely cold weather, and the opening in the plug for the emission of water when the hose is attached being but two inches in diameter. On the contrary, my plug being set directly on the main pipe or chamber of the stop-cock, the constant flow of water under the plug prevents its freezing, having the benefit of the four pipes connecting in said chamber—the combined area of the four four-inch pipes (being the smallest now in use) being fifty inches—equal in area to an eight-inch pipe, or sufficient to supply the emission of an eight-inch plug instead of two inches, as now in use; thus dispensing with the necessity of using the quantity of hose now required, as the nearest plug will give a stream of water equal to several plugs situated in different parts of the city or corporation, to each of which a hose has now to be extended. My fire-plug when placed in the center of the cross-streets, which is a point of easy access and cannot be mistaken, is not intended to project above the surface, but will be covered with a cap, as in Fig. 4; vehicles can pass over without interruption, the cap covering the stop-cock and fire-plug. My valve *b* and the one in use differs in this. The latter is faced on both sides, with two seats for each valve; the former, on the contrary, requires to be placed on one side, with but one seat, the guards or guides *d*, Fig. 3, keeping the valve *b* up to its seat *c* instead of the face and seat, as now required, the screw operating in the valve as in the stop-cocks now in use.

It is obvious that my improved valved plug-head or hose-branch may be located on the pavement and applied to the main by a branch pipe, and that it may be made fixed with the plug without in the least degree departing from my invention.

From the foregoing description it will be seen that the interior valves *l* and their operating-stems *i* enable me to dispense with the usual outer screw-caps, and to open and close the separate plug-head nozzles for the attachment and removal of separate hose at any time during the fire, thereby saving the trouble and great objection of having to stop the flow of water to the fire-plug by closing the large valve whenever more than one hose is desired to be attached or removed, which would have to be done without the interior nozzle-valves, as shown in Fig. 8, Sheet 4.

Having described my invention, I claim—

1. In a fire-plug a removable hose-branch or plug-head, consisting of a vertical screw branch or stem, hose-nozzles *p*, with their valves *l*, and the main-valve wrench or key *n f*, essentially as described.

2. A many-way valved fire-plug head for the attachment and supply of several hose at one and the same time, without interrupting the flow through such as are attached, in combination with a communicating supply-chamber of said plug, essentially as described.

3. A many-way valved plug-head or supply hose-branch, in combination with a valved fire-plug pipe, essentially as described.

4. The chamber *j*, constructed so as to make it answer the double purpose of a through way for one or more branch pipes, and a readily accessible chamber containing a valve or valves, thus making one pit and one cover common to two, three, four, or more mains, instead of several, as now required, all substantially as set forth.

5. The combination of the fire-plug, with the chamber *j* and its branches, and the valve *v*, arranged for the purpose of effecting a circulation of the water under the valve or the fire-plug, to prevent it from freezing.

6. In a many-way fire-plug, I claim the screw hose-branches *p*, made to form the seats for the valves *b* thereof, as described.

7. The wrench *n f* of the many-valved plug-head or hose-branch, in combination with the valve *v* of the fire-plug, as and for the purpose set forth.

8. The removable screw-seat *c* in the ends of the branches or bowls *y*, so as to renew the seats for the valves *b*, when necessary, without disturbing the main or stop cock, access to these seats being through a common chamber, *j*, as herein stated.

JOSEPH L. LOWRY.

Witnesses:

GEO. H. ATKINSON,
THOMAS SNOWDON.